US006137056A

United States Patent [19]
Miyazaki

[11] Patent Number: 6,137,056

[45] Date of Patent: *Oct. 24, 2000

[54] CONSTRUCTION FOR PROCESSING A SHIELD LAYER OF A SHIELDED CABLE

[75] Inventor: Sho Miyazaki, Yokkaichi, Japan

[73] Assignee: Sumitomo Wiring Systems, Ltd., Japan

[ * ] Notice: This patent is subject to a terminal disclaimer.

[21] Appl. No.: 09/288,603

[22] Filed: Apr. 8, 1999

Related U.S. Application Data

[63] Continuation of application No. 08/887,443, Jul. 2, 1997, Pat. No. 5,962,812.

[30] Foreign Application Priority Data

Jul. 4, 1996 [JP] Japan .................................... 8-175149

[51] Int. Cl.$^{7}$ ..................................................... H02G 15/06

[52] U.S. Cl. ................................................ 174/78; 439/98

[58] Field of Search .................................... 174/78, 75 C, 174/74 R, 88 C; 439/98, 99, 578, 608, 609, 610

[56] References Cited

U.S. PATENT DOCUMENTS

| | | |
|---|---|---|
| 3,001,169 | 9/1961 | Blonder . |
| 3,141,924 | 7/1964 | Forney, Jr. . |
| 3,209,287 | 9/1965 | Oxner et al. . |
| 3,240,868 | 3/1966 | Ets-Hokin et al. . |
| 3,264,602 | 8/1966 | Schwartz . |
| 3,383,457 | 5/1968 | Schumacher et al. . |
| 3,527,685 | 9/1970 | Anderson . |
| 3,787,797 | 1/1974 | Kurz . |
| 4,688,877 | 8/1987 | Dreyer . |
| 4,746,305 | 5/1988 | Nomura . |
| 4,834,675 | 5/1989 | Samchisen . |
| 5,059,747 | 10/1991 | Bawa et al. . |
| 5,127,853 | 7/1992 | McMills et al. . |
| 5,432,301 | 7/1995 | Gehring . |
| 5,508,475 | 4/1996 | Profiri et al. . |
| 5,607,320 | 3/1997 | Wright .................................. 439/98 X |
| 5,962,812 | 10/1999 | Miyazaki ................................. 174/78 |

FOREIGN PATENT DOCUMENTS

| | | |
|---|---|---|
| 0 694 989 | of 1996 | European Pat. Off. . |
| 2 276 773 | of 1994 | United Kingdom . |

*Primary Examiner*—Kristine Kincaid
*Assistant Examiner*—Chau N. Nguyen
*Attorney, Agent, or Firm*—Anthony J. Casella; Gerald E. Hespos; Michael J. Porco

[57] ABSTRACT

To facilitate the processing of a shield layer of a shielded cable, an inner tubular member 20 is inserted between a braided wire 3 and an insulation coating 4 of a shielded cable 1. An outer tubular member 10 already mounted on the shielded wire and positioned in its standby position is fitted on the inner tubular member 20. Then, the braided wire 3 is fixed by being held between the inner and outer tubular members 20, 10. Since the outer tubular member 10 is made of a conductive resin material, when it is connected with a housing 27, the braided wire 3 and the housing 27 can be electrically connected.

12 Claims, 3 Drawing Sheets

CONSTRUCTION FOR PROCESSING A SHIELD LAYER OF A SHIELDED CABLE

This application is a continuation of Ser. No. 08/887,443 filed Jul. 2, 1997, U.S. Pat. No. 5,962,812.

BACKGROUND OF THE INVENTION

1. Field of the Invention

The present invention relates to a connection construction for connecting a shield layer of a shielded cable and to a method for processing a shield layer of a shielded cable.

2. Description of the Prior Art

A known construction for processing a shield layer of a shielded cable is shown in FIG. 5. The shown construction is assembled into a shielded connector. A braided wire 3 is processed using a shell 30 formed integrally with a barrel portion 31 for securing the braided wire 3. In this case, the braided wire 3 is exposed at one end of the shielded cable 1 and this exposed portion is secured by the barrel 31.

However, since the barrel portion is tightened to be connected with the shielded cable with the above construction, pliers or like tightening tool is required and a tightening operation itself is cumbersome.

The present invention was developed in view of the above problem, and an object thereof is to provide a construction for easily connecting and a method for easily processing a shield layer of a shielded cable.

SUMMARY OF THE INVENTION

According to the invention, there is provided a connection construction for connecting a shield layer of a shielded cable. The construction comprises an inner tubular member that is insertable inside an exposed portion of the shield layer. A conductive outer tubular member is fitted on the outside of the shield layer, and is engageable with the inner tubular member with the shield layer arranged therebetween and in electric contact with the shield layer.

According to a preferred embodiment, the connection construction further comprises locking means for locking the outer tubular member and the inner tubular member at least in their engaged state or position, the locking means preferably comprising at least one lock groove or recess provided at one of the outer tubular member and the inner tubular member and at least one engaging projection or stepped portion provided at the other of the outer tubular member and the inner tubular member.

Preferably, the inner tubular member is formed at one end thereof with a flange for pressing the inner tubular member and preferably for preventing the disengagement of the inner tubular member from the shield layer.

Further preferably, the inner tubular member comprises elastic deflection allowing means allowing an elastic deflection of the inner tubular means in a radial direction, the elastic deflection allowing means being preferably a slit extending over substantially the entire longitudinal length of the inner tubular means.

According to a further preferred embodiment, the outer tubular member comprises at one of its end portions a flange, in particular for displacing the outer tubular member in an axial direction.

Preferably, the connection construction further comprises a conductive housing being insertable on the outer tubular member and being bringable in electric contact therewith by means of a connection means.

Most preferably, the connection means comprises a conductive coil spring being arrangeable between the conductive housing and the outer tubular member, preferably between a stopper edge portion of the conductive housing and the flange of the outer tubular member.

According to the invention, there is further provided a method for processing a shield layer of a shielded cable, using in particular a connection construction according to the invention, preferably in which the outer surface of an insulation-coated inner wire is surrounded by a shield layer having its outer surface insulation-coated. The method comprises a first step of exposing the shield layer in or along a portion of the shielded cable. The method proceeds by inserting an inner tubular member radially inside from the exposed shield layer. A conductive outer tubular member is fitted radially outside of the shield layer, and the inner tubular member and the outer tubular member are engaged with each other such that the shield layer is arranged therebetween. Thus the outer tubular member is brought into electric contact with the shield layer.

According to a preferred embodiment of the invention, the method further comprises the steps of mounting in advance the outer tubular member on the shielded cable and positioning it in a standby state or position spaced apart from an engaging state or position of the inner and outer tubular members, preferably in a direction opposite from an engaging direction. The method then proceeds by assembling the connection construction by sliding the outer tubular member to the engaging state.

Preferably, the engaging step comprises the step of lockingly engaging the inner and outer members with each other in the engaging state, preferably by bringing at least one lock groove provided at one of the outer tubular member and the inner tubular member into engagement with at least one engaging projection provided at the other of the outer tubular member and the inner tubular member.

Further preferably, the inserting step comprises the step of elastically deflecting the inner tubular member in the radial direction, preferably to reduce the diameter of at least portions of the inner tubular member.

Most preferably, the method further comprises the steps of arranging a conductive housing at least over portions of the outer tubular member and preferably bringing the conductive housing in electric contact with the outer tubular member.

According to a preferred embodiment of the invention, there is provided a construction for connecting or processing a shield layer of a shielded cable in which the outer surface of an insulation-coated inner wire is surrounded by a shield layer having its outer surface insulation-coated, wherein the shield layer is exposed in a portion of the shielded cable. An inner tubular member is inserted inside the exposed shield layer, and a conductive outer tubular member is fitted on the outside of the shield layer, and is engageable with the inner tubular member with the shield layer therebetween to be held above the shield layer in contact therewith.

Accordingly, the shield layer is exposed in one portion of the shielded cable, the inner tubular member is inserted inside the exposed shield layer while the outer tubular member is fitted on the outside of the exposed shield layer. If the outer and inner tubular members are engaged with the shield layer therebetween, the shield layer can be made electrically connectable with an external conductor. Thus, the inner tubular member can be smoothly inserted inside the shield layer, and the outer tubular member can be held by being engaged with the inner tubular member. Therefore, unlike the prior art, the inventive construction does not require a cumbersome operation.

Preferably, the outer tubular member is, in advance, mounted on the shielded cable and positioned in a standby position spaced apart from an engaging position of the inner and outer tubular members in a direction opposite from an engaging direction, and then is assembled by being slid to the engaging position.

Accordingly, since assembling can be completed by sliding the outer tubular member to the engaging position to be engaged with the inner tubular member, operability can be improved.

Further preferably, the inner tubular member is formed at one end thereof with a flange for pressing the inner tubular member and preventing the disengagement of the inner tubular member from the shield layer. Thus, a force which acts in such a direction to disengage the inner tubular member from the shield layer when the outer tubular member is slid to the engaging position can be advantageously dealt with. In other words, if the outer tubular member is slid while pushing this flange in the engaging direction, both tubular members can be smoothly engaged.

These and other objects, features and advantages of the present invention will become more apparent upon a reading of the following detailed description and accompanying drawings.

DETAILED DESCRIPTION OF THE PREFERRED EMBODIMENT

Figure 1:
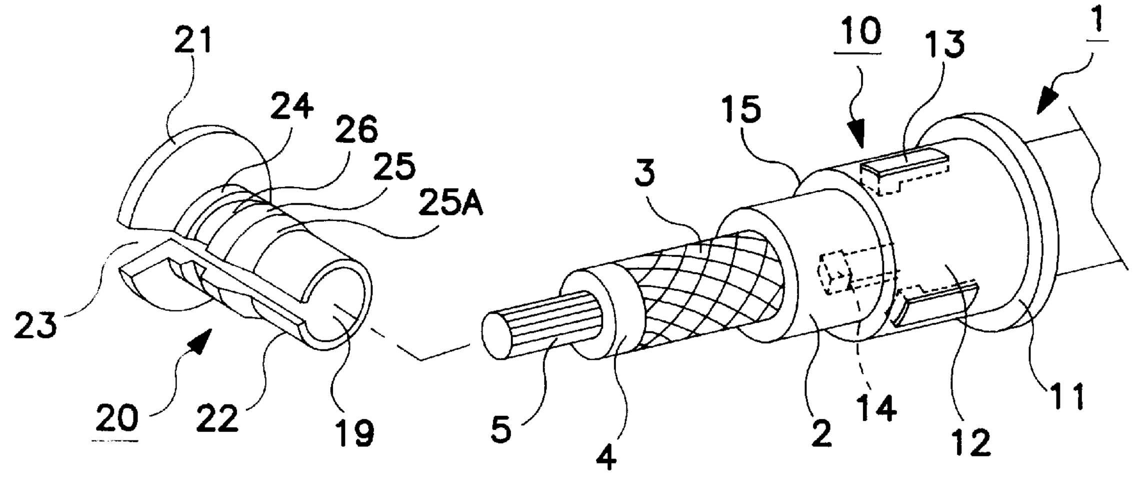
FIG. 1 is a perspective view of a shielded cable before a shield layer processing.

Hereafter, one embodiment of the invention is described with reference to FIGS. 1 to 4. FIG. 1 shows a shielded cable 1 according to this embodiment before the processing of one end thereof. In this embodiment, a braided wire 3 of the shielded cable 1 is electrically connected or processed by an inner tubular member 20 and an outer tubular member 10.

The shielded cable 1 is comprised of four layers: a core 5, an insulation coating 4, the braided wire 3 and a sheath 2 in this order from the center. The core 5 is made of a conductive metal, and an unillustrated terminal fitting is mounted on its end. The insulation coating 4 is made of an insulating material and surrounds the core 5.

The braided wire 3 is formed by weaving a plurality of fine conductive wires. The sheath 2 as an outermost layer of the shielded cable 1 is made of an insulating material being preferably heat resistant and adapted to insulate the entire shielded cable 1.

The inner tubular member 20 is a substantially hollow cylindrical member made e.g. of a synthetic resin, and is inserted or insertable between the insulation coating 4 and the braided wire 3 when the braided wire 3 is to be assembled. Preferably the insertion end of the inner tubular member is slanted so as to render the insertion between the insulation coating 4 and the braided wire 3 easier. The inner tubular member 20 is comprised of a flange 21 and a tubular portion 22 projecting substantially coaxially with the flange 21. An insertion hole 19 extends along the longitudinal direction of the tubular portion 22. Further, a slit 23 is formed entirely over the length of the inner tubular member 20: from an opening end of the tubular portion 22 to the flange 21. The insertion hole 19 is formed such that its diameter is normally slightly smaller than the outer diameter of the insulation coating 4, but is elastically deformable in an enlarging and/or restriction direction by the slit 23, preferably when the inner tubular member 20 is fitted on the insulation coating 4. The slit 23 also allows the inner tubular member 20 to be elastically deformable in a narrowing direction during the assembling of the inner tubular member 20 and the outer tubular members 10.

At a side of the tubular portion 22 toward the flange 21, there are formed two thick portions 24, 25 which circumferentially extend. The thick portion 24 more toward the flange 21 is continuous with a rear part of the flange 21, whereas the other thick portion 25 is spaced apart from the thick portion 24 by a specified distance and has its outer edge tapered to form a guide surface 25A which acts to guide engaging projections 14 of the outer tubular member 10 to be described later. Between the thick portions 24, 25 is defined a lock groove 26 which is engageable with the engaging projections 14 of the outer tubular member 10.

The outer tubular member 10 is a substantially hollow cylindrical member made e.g. of a conductive synthetic resin (e.g. a resin such as acrylate or polyolefin mixed with metal powder such as Au, Ag, Cu, Al and/or graphite powder). The outer tubular member 10 is formed with a flange 11 and can be assembled with the braided wire 3 by engaging the inner tubular member 20. An insertion hole 15 of the outer tubular member 10 is formed such that its diameter is equal to or slightly larger than the outer diameter of the sheath 2. Accordingly, the outer tubular member 10 is movable along the length of the shielded cable 1 after being mounted on the sheath 2. However, when the inner tubular member 20 is inserted inside the braided wire 3, thereby causing the braided wire 3 to bulge out, this bulged portion of the braided wire 3 comes into contact with the inner circumferential surface of the outer tubular member 10.

Figure 3:
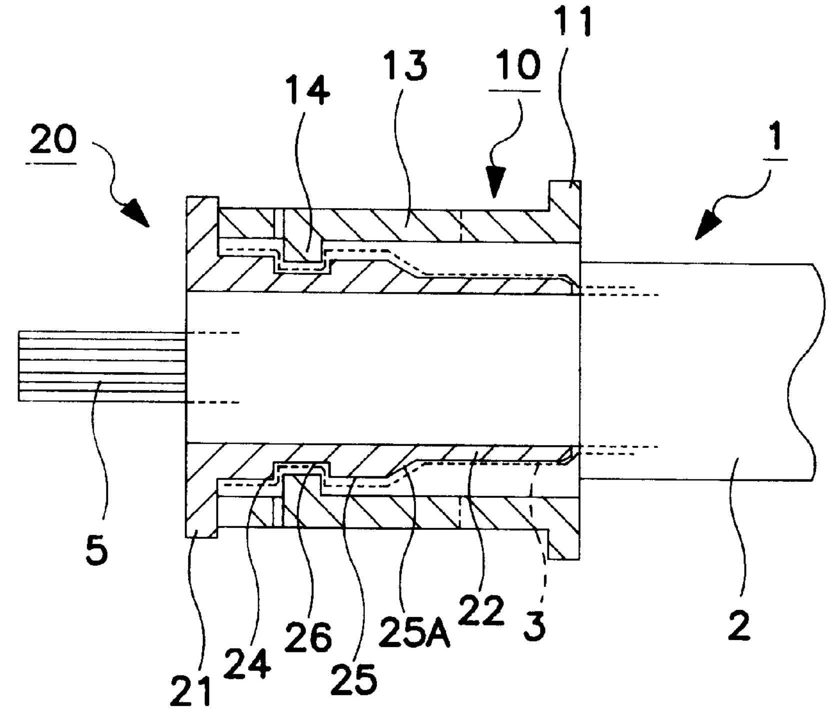
FIG. 3 is a side view in section of the shielded cable after the shield layer processing.

The flanges 11, 21 of the outer and inner tubular members 10, 20 are pushed toward each other when the tubular members 10, 20 are to be engaged with each other. In a tubular portion 12 of the outer tubular member 10, three elastic portions 13 are preferably equally circumferentially spaced or formed as shown in FIGS. 1 and 3. Each elastic portion 13 preferably is formed by cutting such that its end toward the flange 11 is a fixed end, and is elastically deformable in a substantially radial direction. On the inner side of the leading end of each elastic portion 13, there is formed the engaging projection 14 which is engageable with the lock groove 26 of the inner tubular member 20.

The action and effects of this embodiment constructed as above are described in detail.

First, an end of the shielded cable 1 is processed as shown in FIG. 1. Specifically, the shielded cable 1 is peeled up to the insulation coating 4 at the very end to expose only the core 5. At a portion of the shielded cable 1 slightly behind this end, only the sheath 2 is peeled to expose the braided wire 3. At this time, a preferably narrow margin of the front end of the braided wire 3 is cut off to avoid a contact with the core 5 and to expose the insulation coating 4. The length of the exposed portion of the braided wire 3 is slightly longer than the length of the inner tubular member 20.

The outer tubular member 10 is mounted or inserted on the thus processed shielded cable 1 and positioned in its standby position on the sheath 2 (FIG. 1).

Figure 2:
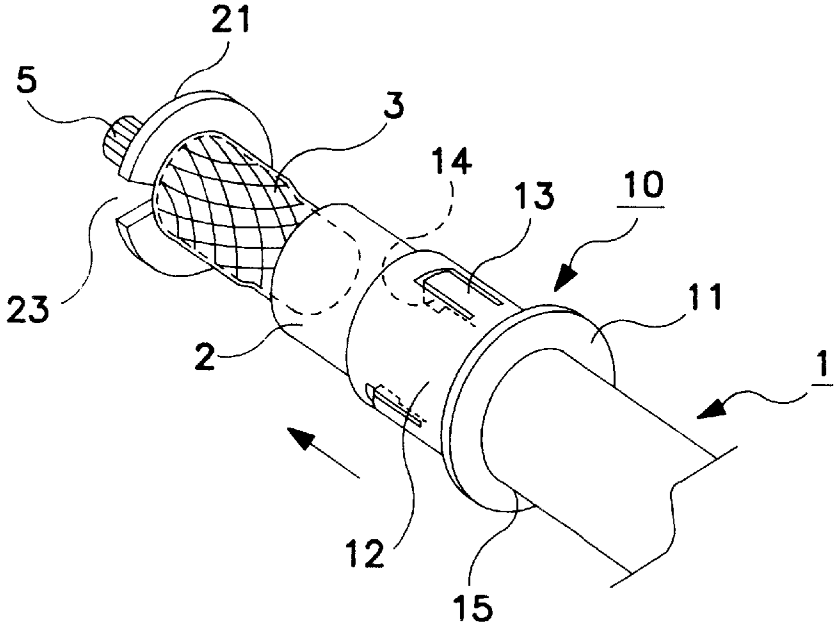
FIG. 2 is a perspective view of the shielded cable when an inner tubular member is inserted below the shield layer.

Subsequently, the tubular portion 22 of the inner tubular member 20 is inserted substantially between the braided wire 3 and the insulation coating 4 of the shielded cable 1, leaving the flange 21 exposed (see FIG. 2). Then, the flange 11 of the outer tubular member 10 is pushed to move the outer tubular member 10 toward the inner tubular member 20. At this time, it is also necessary to hold the flange 21 of the inner tubular member 20 so as to prevent the disengagement of the inner tubular member 20 from the braided wire 3. When the outer tubular member 10 moves onto the inner tubular member 20, both tubular members 10, 20 press the braided wire 3 and exert pushing forces to each other. Then, the inner tubular member 20 is elastically deformed in such a direction to make the inner diameter thereof smaller because of the presence of the slit 23, and the elastic portions 13 of the outer tubular member 10 are elastically deformed in radial directions, thereby increasing a degree of engagement of the outer and inner tubular members 10, 20. When both tubular members 10, 20 are further pressed toward each other, the engaging projections 14 move beyond the guide surface 25A and engage the lock groove 26 with a part of the braided wire 3 substantially therebetween. In this way, the engagement of the tubular members 10, 20 is completed and the assembling of the braided wire 3 is completed (see FIG. 3).

Since the inner and outer tubular members 20, 10 are engaged while assembling the braided wire 3, the braided wire 3 and the outer tubular member 10 are electrically connected.

Figure 4:
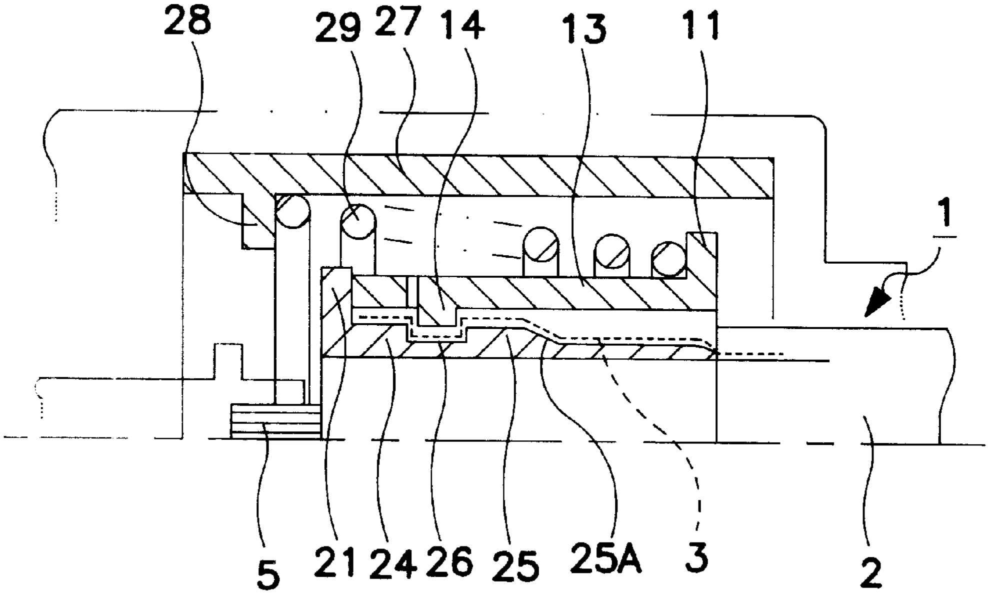
FIG. 4 is a side view in section showing a state where the shielded cable after the shield layer processing is accommodated in a housing (upper half).
Figure 5:
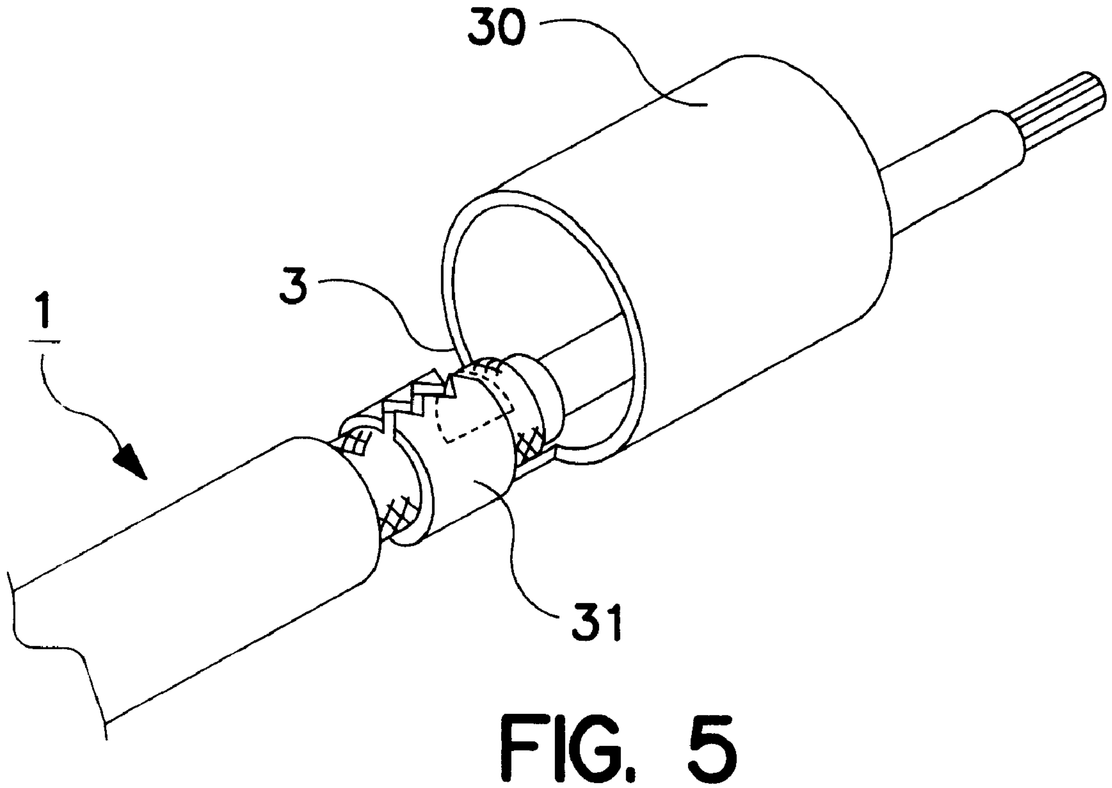
FIG. 5 PRIOR ART
FIG. 5 is a perspective view of a shielded cable after a shield layer processing (prior art).

The above description is made on the end processing of the braided wire 3 of the shielded cable 1. More specifically, the shielded cable 1 is inserted into a conductive housing 27 accommodating, for example, a power source circuit (see FIG. 4). A stopper edge 28 projects inside the housing 27 toward the outer tubular member 10 (FIG. 4). By providing a coil spring 29 made of a conductive metal between the flange 11 of the outer tubular member 10 and the stopper edge 28, the braided wire 3 and the housing 27 can be electrically connected (see FIG. 4).

According to the invention, the end of the shielded cable 1 can be processed without applying a special processing to the braided wire 3, i.e. by only sliding the outer tubular member 10. Accordingly, a cumbersome operation can be obviated, thereby improving operability. Further, since the braided wire 3 and the outer tubular member 10 are in close contact with each other over the entire circumference, the reliability of electrical connection of this contact portion is high.

A variety of changes can be made in the invention, and following modifications are also embraced by the technical scope of the invention as defined in the claims.

In the foregoing embodiment, the inner tubular member 20 is formed with the slit 23 which allows the tubular portion 22 to elastically deform in its narrowing direction, whereas the outer tubular member 10 is formed with the elastic portions 13 which are elastically deformable in radial directions. The slit 23 and the elastic portions 13 are provided to facilitate the assembling of the outer and inner tubular members 10, 20, but both of them may not necessarily be provided. In other words, the processing construction may include only either the slit 23 of the inner tubular member 20 or the elastic portions 13 of the outer tubular member 10.

Although the lock groove 26 is provided in the inner tubular member 20 and the engaging projections 14 are provided in the outer tubular member 10, an inverse arrangement may be adopted.

The slit 23 may be formed in the outer tubular member 10 to make it elastically deformable in its radial directions.

The outer tubular member 20 may be divided into two fittable halves along its length, and the two halves may be fitted to each other while surrounding the braided wire 3. In such a case, the slit 23 of the inner tubular member 20 can be dispensed with.

Instead of the engaging projections 14, an annular engaging projection engageable with the lock groove 26 may be formed to extend over the entire circumference of the inner surface of the outer tubular member 10.

Although the braided wire 3 is used as a shield layer in the foregoing embodiment, fine wires wound in a direction transverse to the length of the shielded cable or arranged along the length of the shielded cable, a copper foil, an aluminum foil, a conductive tape, a conductive pipe or any other widely used shield may be used as a shield layer.

Although only the construction for processing the end of the shielded cable is shown in the foregoing embodiment, the invention is also applicable, for example, to a case where grounding is applied to an intermediate portion of a shielded cable.

Although the embodiment has been described with respect to a shielded cable having a substantially circular cross section, the invention is also applicable to cables having cross sections different from the circular cross section, e.g. having quadratic, rectangular, elliptical, etc. cross sections. Then also the inner and outer tubular members will have a corresponding cross section.

What is claimed is:

1. A connection construction for a shielded cable, said shielded cable comprising a conductive core, an insulation coating surrounding said conductive core, a shield layer surrounding said insulation coating and a sheath surrounding said shield layer, said shielded cable further having at least one end, portions of said insulation coating, said shield layer and said sheath adjacent said at least one end being removed for exposing said conductive core and for defining an end of said insulation coating, a further portion said sheath adjacent said end of said insulating coating being removed for exposing said shield layer, said connection construction comprising:

an inner tubular member having opposed first and second ends and opposed inner and outer circumferential surfaces, said inner tubular member having an annular lock recess formed in the outer circumferential surface thereof, the first end of the inner tubular member being inserted inside the exposed portion of the shield layer a sufficient distance for the second end of the inner tubular member to substantially align with the end of the insulation coating, such that the shield layer overlies the annular lock recess of the inner tubular member and such that substantially all of the inner circumferential surface of the inner tubular member surrounds and engages the insulation coating; and a conductive outer tubular member having opposed first and second ends, said second end of said outer tubular member being substantially aligned with said second end of said first and second ends of said outer tubular member surrounding the exposed portion of the shield layer, the outer tubular member being formed with a plurality of circumferentially spaced elastic portions, each of said elastic portions having a first end that is fixed relative to remaining portions of said outer tubular member and a second end that is deflectable relative to said remaining portions of said outer tubular member, said second end of each of said elastic portions having an inwardly extending engaging projection, each of said engaging projections being registered with said lock recess of the inner tubular member and being dimensioned such that each of said engaging projections urges an adjacent portion of the shield layer into said annular lock recess for locking said inner and outer tubular members together, and for electrically engaging said outer tubular member with the shield layer.

2. A connection construction according to claim 1, wherein the second end of the inner tubular member is formed with a flange for pressing the inner tubular member and preventing disengagement of the inner tubular member from the shield layer, the second end of the outer tubular member abutting said flange of the inner tubular member.

3. A connection construction according to claim 1, wherein the inner tubular member comprises elastic deflection allowing means for allowing an elastic deflection of the inner tubular member in a radial direction.

4. A connection construction according to claim 3, wherein the elastic deflection allowing means comprises a slit extending over substantially the entire longitudinal length of the inner tubular member.

5. A connection construction according to claim 1, wherein the outer tubular member comprises at its first end a flange for facilitating movement of the outer tubular member in an axial direction.

6. A connection construction according to claim 1, further comprising a conductive housing dimensioned and configured for receiving the outer tubular member and having connection means for electrically contacting the outer tubular member.

7. A connection construction according to claim 6, wherein the connection means comprises a conductive coil spring between the conductive housing and the outer tubular member.

8. A connection construction according to claim 7, wherein the outer tubular member includes an outwardly extending flange and wherein the conductive housing includes an inwardly extending stopper edge portion, the conductive coil spring being biased in electrical contact between the flange and the stopper edge portion.

9. A connection construction according to claim 1, wherein the inner tubular member is formed from a synthetic resin.

10. A connection construction according to claim 1, wherein the second end of the inner tubular member is formed with an outwardly extending flange, said flange being spaced a selected distance from the annular lock recess of the inner tubular member, the inwardly extending engaging projections of the respective elastic portions of the outer tubular member being spaced from the second end of the outer tubular member by a distance substantially equal to the selected distance between the flange and the annular lock recess of the inner tubular member such that abutment of said second end of said outer tubular member with said flange of said inner tubular member ensures alignment of said engaging projections with said annular lock recess.

11. A connection construction according to claim 10, wherein said outer circumferential surface of said inner tubular member at locations adjacent said locking recess define an outside diameter, and wherein said engaging projections of said outer tubular member define an inside diameter substantially equal to the outside diameter of the inner tubular member, such that said engaging projections urge portions of said shield layer into said annular lock recess of said inner tubular member.

12. A connection construction according to claim 1, wherein said outer circumferential surface of said inner tubular member at locations adjacent said locking recess define an outside diameter, and wherein said engaging projections of said outer tubular member define an inside diameter substantially equal to the outside diameter of the inner tubular member, such that said engaging projections urge portions of said shield layer into said annular lock recess of said inner tubular member.

* * * * *